US012484135B2

(12) United States Patent
Watanabe et al.

(10) Patent No.: US 12,484,135 B2
(45) Date of Patent: Nov. 25, 2025

(54) X-RAY TUBE

(71) Applicant: CANON ELECTRON TUBES & DEVICES CO., LTD., Otawara (JP)

(72) Inventors: Toshimi Watanabe, Yaita (JP); Junki Sone, Nasushiobara (JP)

(73) Assignee: CANON ELECTRON TUBES & DEVICES CO., LTD., Otawara (JP)

( * ) Notice: Subject to any disclaimer, the term of this patent is extended or adjusted under 35 U.S.C. 154(b) by 135 days.

(21) Appl. No.: 18/337,558

(22) Filed: Jun. 20, 2023

(65) Prior Publication Data

US 2023/0337348 A1 Oct. 19, 2023

Related U.S. Application Data

(63) Continuation of application No. PCT/JP2021/019174, filed on May 20, 2021.

(30) Foreign Application Priority Data

Dec. 21, 2020 (JP) ................................ 2020-211339

(51) Int. Cl.
*H01J 35/00* (2006.01)
*H01J 35/08* (2006.01)
*H05G 1/10* (2006.01)

(52) U.S. Cl.
CPC ............... *H05G 1/10* (2013.01); *H01J 35/08* (2013.01)

(58) Field of Classification Search
CPC ................ H05G 1/10; H01J 2235/0233; H01J 2235/1216; H01J 35/08; H01J 35/165
See application file for complete search history.

(56) References Cited

U.S. PATENT DOCUMENTS 5,495,138 A 2/1996 Behr et al.
2016/0126054 A1 5/2016 Friedemann et al.

FOREIGN PATENT DOCUMENTS

EP 0 477 857 B1 12/1993
JP 50-148974 U 12/1975
JP 3008963 U 3/1995
JP 8-236246 A 9/1996
JP 11-18240 A 1/1999
(Continued)

OTHER PUBLICATIONS

English Translation JP2002216682A (Year: 2002).*
(Continued)

*Primary Examiner* — Dani Fox
(74) *Attorney, Agent, or Firm* — Oblon, McClelland, Maier & Neustadt, L.L.P.

(57) ABSTRACT

According to one embodiment, an X-ray tube includes a vacuum enclosure in which an output window which transmits X-rays is formed, an anode target provided in the vacuum enclosure so as to oppose the output window, a cathode filament provided in the vacuum enclosure, that emits electrons to be irradiated onto the anode target, a power feed section to which a high voltage cable is connected, and an insulating portion that covers the power feed section and the high-voltage cable with an insulating material, and the power feed section includes a contact surface with which a distal end surface of the high-voltage cable is brought into contact, and an angle formed by the contact surface and the side surface of the high-voltage cable is an acute angle.

4 Claims, 3 Drawing Sheets

(56) References Cited

FOREIGN PATENT DOCUMENTS

| | | | | |
|---|---|---|---|---|
| JP | 2002216682 | A | * | 8/2002 |
| JP | 2007-42434 | A | | 2/2007 |
| JP | 2007-242556 | A | | 9/2007 |
| JP | 2008-293868 | A | | 12/2008 |
| JP | 2010-223352 | A | | 10/2010 |
| JP | 2010-244709 | A | | 10/2010 |
| JP | 4850542 | B2 | | 1/2012 |
| JP | 2016-131109 | A | | 7/2016 |
| JP | 6440192 | B2 | | 12/2018 |
| KR | 10-2014-0107192 | A | | 9/2014 |

OTHER PUBLICATIONS

Japanese Office Action issued on Jan. 9, 2024 in Japanese Patent Application No. 2020-211339 (with English translation), 11 pages.
International Search Report issued Aug. 17, 2021 in PCT/JP2021/019174, filed on May 20, 2021, 2 pages.
Extended European Search Report issued Oct. 14, 2024 in European Patent Application No. 21909753.2, 9 pages.
Japanese Office Action issued Oct. 17, 2023 in Japanese Patent Application No. 2020-211339 (with English Translation), 8 pages.
Office Action issued Jul. 11, 2023, in corresponding Japanese Patent Application No. 2020-211339 (with English Translation), 8 pages.
Korean Office Action issued Feb. 14, 2025, in corresponding Korean Patent Application No. 10-2023-7018400 (with English Translation), 9 pages.

* cited by examiner

X-RAY TUBE

CROSS-REFERENCE TO RELATED APPLICATIONS

This application is a Continuation Application of PCT Application No. PCT/JP2021/019174, filed May 20, 2021 and based upon and claiming the benefit of priority from Japanese Patent Application No. 2020-211339, filed Dec. 21, 2020, the entire contents of all of which are incorporated herein by reference.

FIELD

Embodiments described herein relate generally to an X-ray tube.

BACKGROUND

Generally, as X-ray tubes, fixed anode X-ray tubes are known.

The fixed anode X-ray tubes comprise a vacuum enclosure, an anode target, a cathode filament, a power feed section, a high-voltage cable connected to the power feed section, and an insulating section which covers the power feed section and the high-voltage cable with insulating material. A flat portion at one end of the vacuum enclosure has an output window that transmits X-rays.

The anode target is located inside the vacuum enclosure so as to oppose the output window. The cathode filament is located inside the vacuum enclosure and emits electrons to be irradiated onto the anode target.

To the power feed section, the high-voltage cable that supplies high voltage to the anode target is connected, and the area around the power feed section and the high-voltage cable is covered by an insulating material.

However, during the manufacturing process of X-ray tubes and during use in the market, defects such as cracks, voids (cavities), exfoliation and the like occur in the insulation material provided around the power feed section and the high-voltage cable, and thus, the performance of the voltage withstand of the X-ray tube deteriorates undesirably.

The embodiments have been achieved in consideration of the above-provided points, and an object thereof is to provide an X-ray tube that can prevent a decrease in voltage holding capability.

DETAILED DESCRIPTION

Embodiments will be described hereinafter with reference to the accompanying drawings.

In general, according to one embodiment, an X-ray tube comprises:

a vacuum enclosure in which an output window which transmits X-rays is formed;

an anode target provided in the vacuum enclosure so as to oppose the output window;

a cathode filament provided in the vacuum enclosure, that emits electrons to be irradiated onto the anode target;

a power feed section to which a high voltage cable is connected to supply high voltage to the anode target;

an insulating portion that covers the power feed section and the high-voltage cable with an insulating material, wherein the power feed section includes a contact surface with which a distal end surface of the high-voltage cable is brought into contact, and an angle formed by the contact surface and the side surface of the high-voltage cable is an acute angle.

Now, an X-ray tube 1 in one embodiment of the present invention will be explained in detail.

Figure 1:
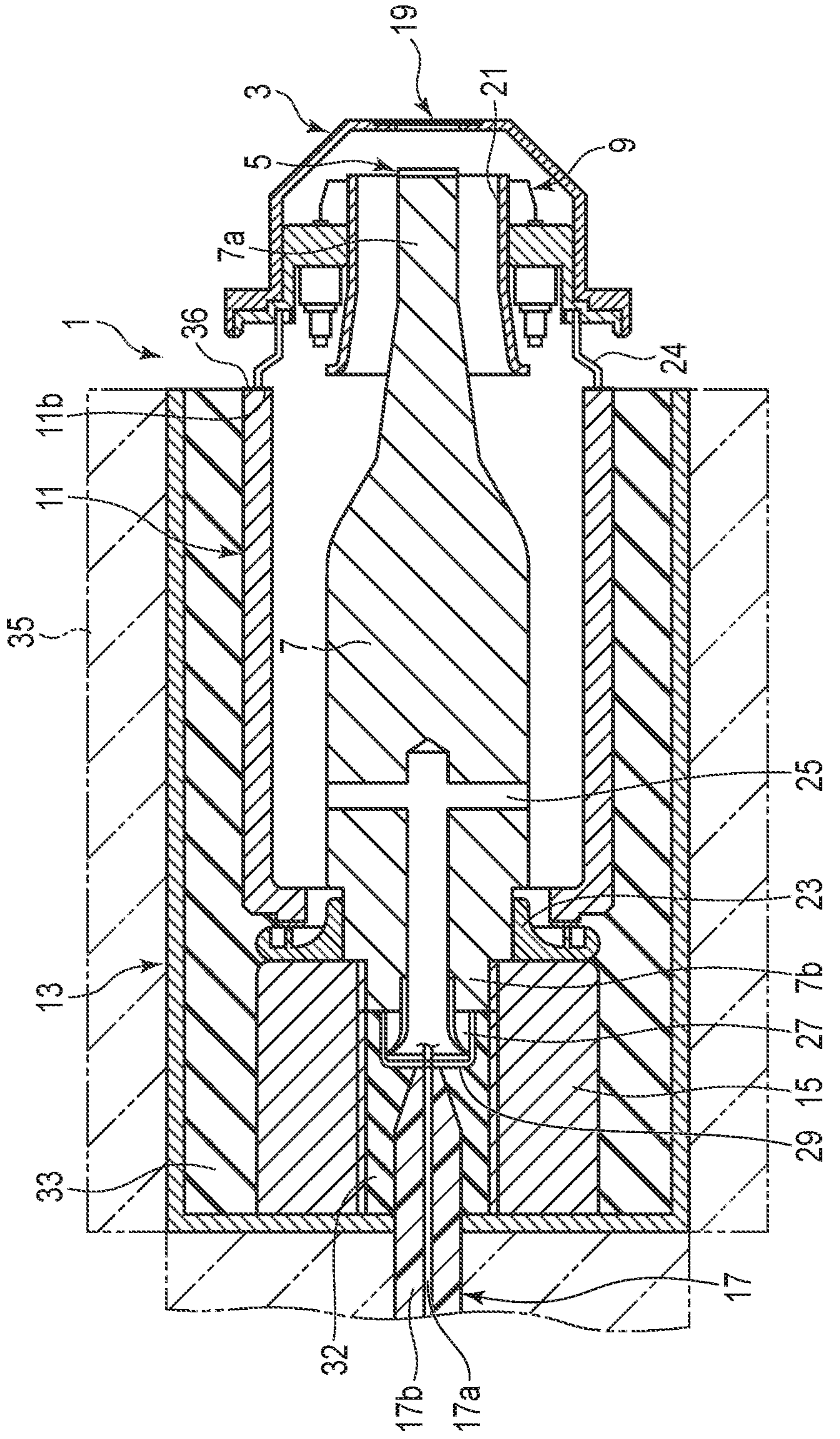
FIG. 1 is a cross-sectional view schematically showing a configuration of an X-ray tube according to the first embodiment.

As shown in FIG. 1, the X-ray tube 1 of the first embodiment is a fixed anode type X-ray tube and comprises a vacuum enclosure 3, an anode target 5, a support 7, a cathode filament 9, an insulating enclosure 11, a tube container 13, a heat radiator 15, and a high voltage cable 17.

The vacuum enclosure 3 maintains a vacuum inside and has a cylindrical shape with a distal end portion whose outer diameter gradually tapering down, which includes an output window 19 that transmits X-rays on a flat portion of a distal end surface thereof.

The output window 19 is made of beryllium (Be), for example, as a material with low attenuation of X-rays.

Inside the vacuum enclosure 3, the anode target 5 is placed to oppose the output window 19, and the cathode filament 9 is placed on an outer circumferential side of the anode target 5. Note that a converging electrode 21 is provided between the anode target 5 and the cathode filament 9.

Further, in a central portion of the vacuum enclosure 3, a distal end portion 7*a* of the support 7 is located. The distal end portion 7*a* of the support 7 is disposed on an inner circumferential side of the converging electrode 21 and supports the anode target 5 by the distal end. The other end portion 7*b* of the support 7 protrudes from the other end side of the insulating enclosure 11, and a joint member (an anode-side metal enclosure) 23 is brazed thereto. Thus, the insulating enclosure 11 and the support 7 jointed together in a sealed state by the joint member 23.

A metal film 36 is formed on a distal end surface (one end surface) 11*b* of the insulating enclosure 11, and a cathode-side metal enclosure 24, which supports the cathode filament 9, is brazed to the metal film 36.

On the end surface of the other end portion 7*b* of the support 7, an exhaust pipe 27 is provided to exhaust the inside of the vacuum enclosure 3 through an exhaust channel 25 formed inside the support 7, and further, a power feed section 29 is provided, to which the high voltage cable 17 is connected to apply high voltage to the anode target 5.

The insulating heat radiator 15 has a female threaded portion, which is tightened to a male threaded portion formed on the other end portion 7*b* of the support 7, and one end surface thereof is brought into contact with the joint member 23.

The heat radiator 15 is ceramics having high thermal conductivity characteristics of 20 W/m·K or higher and high voltage insulation of 10 kV/mm or higher, and when, for example, aluminum nitride is used, a high thermal conductivity of 90 W/m·K or higher can be achieved.

Figure 2:
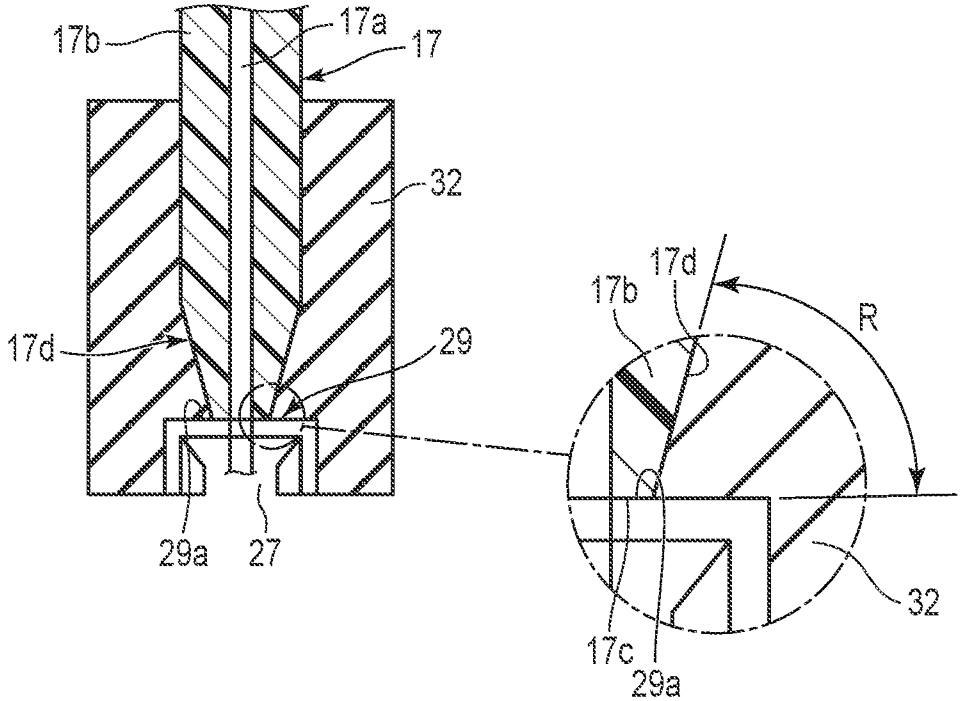
FIG. 2 is a cross-sectional view focusing on a joint portion between the power feed section and the high-voltage cable shown in FIG. 1 and its surrounding area.

As shown in FIG. 2, the power feed section 29 includes a contact surface 29*a* with which the high voltage cable 17 is brought into contact, and the contact surface 29*a* is a flat surface.

As shown in FIG. 1, the high-voltage cable 17 is located on the inner circumferential side of the heat radiator 15 and is drawn out of the heat radiator 15. The high-voltage cable 17 is constituted by a core material 17*a* and a silicon resin-made coating material 17*b* that covers the core material 17*a*.

Between the high-voltage cable 17 and the heat radiator 15, a cable-side insulating material 32 is filled.

The insulating enclosure 11, whose interior is vacuumed together with the vacuum enclosure 3, the other end portion 7*b* of the support 7, which protrudes from the insulating enclosure 11, a part of the heat radiator 15 and the like are accommodated in the tube container 13. The interior of the tube container 13 is filled with an insulating material 33 of the inner side of the tube. In more detail, the tube inner-side insulating material 33 is filled between the tube container 13 and the insulating enclosure 11, the joint member 23 and the heat radiator 15.

Note that the cable side insulation material 32 and the tube inner-side insulation material 33 are, for example, potting materials such as of silicone resin.

A cooling section 35 is arranged on the outer surface of the tube container 13. For this cooling section 35, an air-cooling type, a liquid-cooling type, or a heat pipe type, for example, can be selected according to the input of the X-ray tube 1, but the air-cooling type or the heat pipe type, which is easier to maintain and manage, is preferred. The cooling section may be a radiator.

By the impact of electrons on the anode target 5, heat is generated, and the heat of the anode target 5 is transferred to the support 7, then dissipated and conducted through the joint member 23 connected to the other end portion 7*b* of the support 7 to the insulating enclosure 11, the insulating materials 32 and 33 and the heat radiator 15. Further, the heat is dissipated and conducted through the heat radiator 15 to the insulating materials 32 and 33, the tube container 13 and the like. The heat conducted from the insulating materials 32 and 33 and the heat radiator 15 to the tube container 13 is released by the cooling section 35 that cools the outer surface of the tube container 13. In this embodiment, the heat radiator 15 is directly connected to the other end portion 7*b* of the support 7, and therefore the heat generated by the anode target 5 and transferred to the support 7 can be released more efficiently.

Here, the joint portion between the high-voltage cable 17 and the power feed section 29 will now be explained. As shown in FIG. 2, the distal end surface 17*c* of the high-voltage cable 17 is a flat surface and is in contact with the contact surface 29*a* of the power feed section 29.

A side surface 17*d* of the high-voltage cable 17 is formed into a tapered shape whose diameter gradually decreases towards a distal end surface 17*c* side.

An angle R formed between the contact surface 29*a* of the power feed section 29 and the side surface 17*d* of the high voltage cable 17 is an acute angle, and the angle R should preferably be 10 to 80 degrees, more preferably, 20 to 60 degrees.

By joining the high-voltage cable 17 and the power feed section 29 together at an acute angle R, the following advantage can be obtained. That is, when the cable-side insulation material 32 is filled between the side surface 17*d* of the high-voltage cable 17 and the power feed section 29 in the manufacturing process of the X-ray tube 1, the residual stress generated inside the cable-side insulation material 32 between the side surface 17*d* of the high-voltage cable 17 and the contact surface 29*a* of the power feed section 29 can be relaxed in a series of processing steps including injection of the cable side insulation material 32, curing by heating and cooling.

By relaxing the residual stress in the cable-side insulation material 32, the cracks, voids and exfoliation, which may occur inside the cable-side insulation material 32 can be suppressed, and thus the voltage withstanding performance at the joint portion between the high voltage cable 17 and the power feed section 29 can be maintained, thereby making it possible to obtain a highly reliable X-ray tube 1.

Further, according to this embodiment, the side surface 17*d* of the high-voltage cable 17 is simply formed into a tapered shape, and thus it can be easily achieved by cutting or the like.

Other embodiments will be described below. In the embodiments described below, parts that have the same effects as those of the embodiment described above will be marked with the same symbols, and detailed descriptions of those parts will be omitted. The following descriptions will be provided for points that differ mainly from those of the above-provided embodiment.

Figure 3:
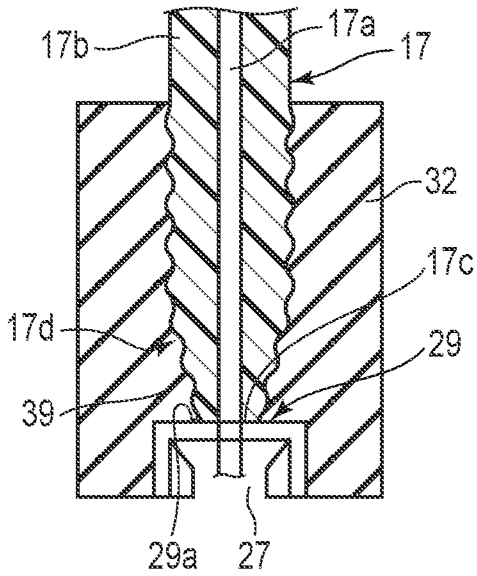
FIG. 3 is a cross-sectional view of a portion corresponding to that of FIG. 2 according to the second embodiment.

The second embodiment shown in FIG. 3 is different from the first embodiment in that uneven portions 39 are formed on the side surface 17*d* of the high voltage cable 17 of the first embodiment shown in FIG. 2.

The uneven portions 39 are formed by sandblasting in the second embodiment, but may be formed by scraping or the like.

According to this second embodiment, advantageous effects similar to those of the first embodiment described above can be achieved. In addition, with the uneven portions 39 thus formed on the side surface of the high-voltage cable 17, the surface area where the high-voltage cable 17 is in contact with the cable-side insulation material 32 is increased, and the adhesiveness with the cable-side insulation material 32 can be improved.

Figure 4:
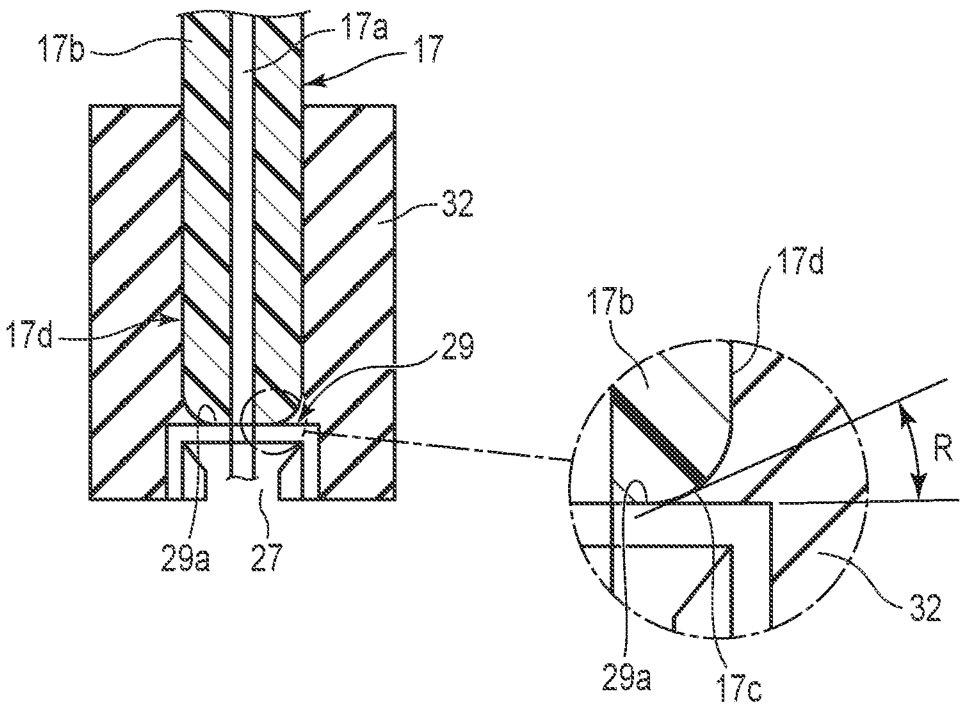
FIG. 4 is a cross-sectional view of a portion corresponding to that of FIG. 2 according to the third embodiment.

The third embodiment shown in FIG. 4 is different from the first embodiment in that the side surface 17*d* continuous with the distal end surface 17*c* of the high voltage cable 17 of the first embodiment shown in FIG. 2 is formed into a circular arc shape.

According to this third embodiment, advantageous effects similar to those of the first embodiment described above can be achieved. In addition, with the side surface 17*d* continuous with the distal end surface 17*c* formed into an arc shape, the angle R formed between the contact surface 29*a* of the power feed section 29 and the side surface 17*d* of the high voltage cable 17 can be made an acute angle even smaller than that of the first embodiment. The arc shape of the side surface 17*d* continuous with the distal end surface 17*c* can be easily formed by cutting.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the high-voltage cable 17 of the third embodiment, as in the second embodiment, an uneven portion 39 may be formed on the side surface 17*d* in contact with the cable-side insulation material 32. In this case, as in the second embodiment, adhesion with the cable-side insulation material 32 can be improved.

Note that in the high voltage cable 17 of the third embodiment, the distal end surface 17*c* and the side surface 17*d* may as well be made into a hemispherical surface shape as a whole.

What is claimed is:

1. An X-ray tube, comprising:

a vacuum enclosure in which an output window which transmits X-rays is formed;

an anode target provided in the vacuum enclosure so as to oppose the output window;

a cathode filament, provided in the vacuum enclosure, that emits electrons to be irradiated onto the anode target;

a power feed section to which a high-voltage cable is connected to supply high voltage to the anode target;

an insulating portion that covers the power feed section and the high-voltage cable with an insulating material, wherein the power feed section includes a contact surface with which a distal end surface of the high-voltage cable is brought into contact, an angle formed by the contact surface and a side surface of the high-voltage cable is an acute angle, the high-voltage cable includes a core material in which the high voltage is applied and a coating material that covers the core material, the core material and the coating material are present on the distal end surface of the high-voltage cable, the core material of the high-voltage cable is connected to the contact surface, and the coating material is brought into contact with the contact surface.

2. The X-ray tube according to claim 1, wherein the side surface of the high voltage cable is formed into a tapered shape, a diameter of which is gradually decreased on a side of the distal end surface.

3. The X-ray tube according to claim 2, wherein the side surface of the high voltage cable is formed into an uneven surface.

4. The X-ray tube according to claim 1, wherein the side surface of the high voltage cable is formed into an uneven surface.

* * * * *